Figure 1:
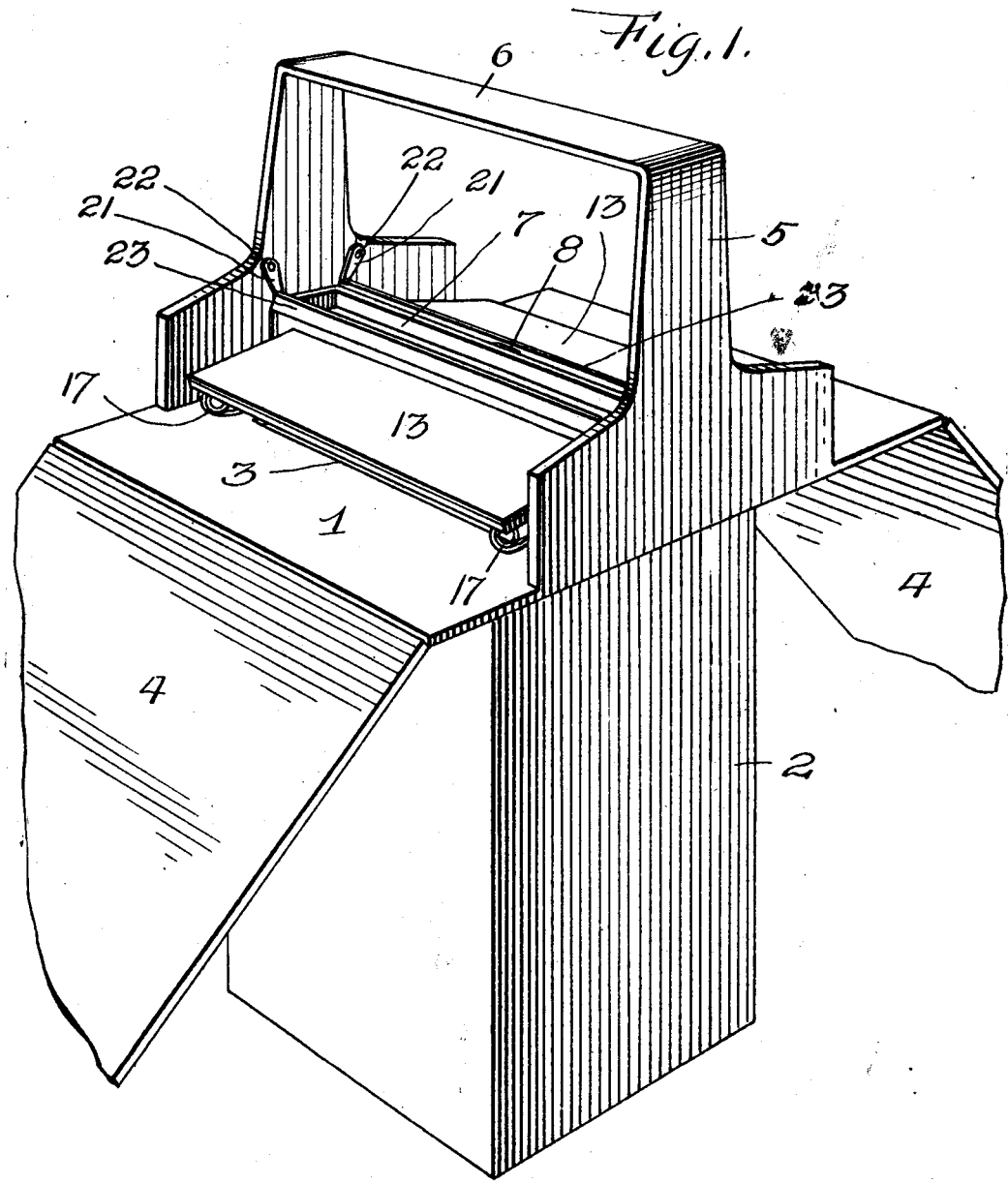

J. GRESKO.
ELECTRIC RAT TRAP.
APPLICATION FILED NOV. 25, 1911.

1,033,579.

Patented July 23, 1912
2 SHEETS—SHEET 1.

WITNESSES
Samuel Payne
Ralph C. Evert

INVENTOR
J. Gresko,
BY
ATTORNEYS

J. GRESKO.
ELECTRIC RAT TRAP.
APPLICATION FILED NOV. 25, 1911.
1,033,579.
Patented July 23, 1912.
2 SHEETS—SHEET 2.
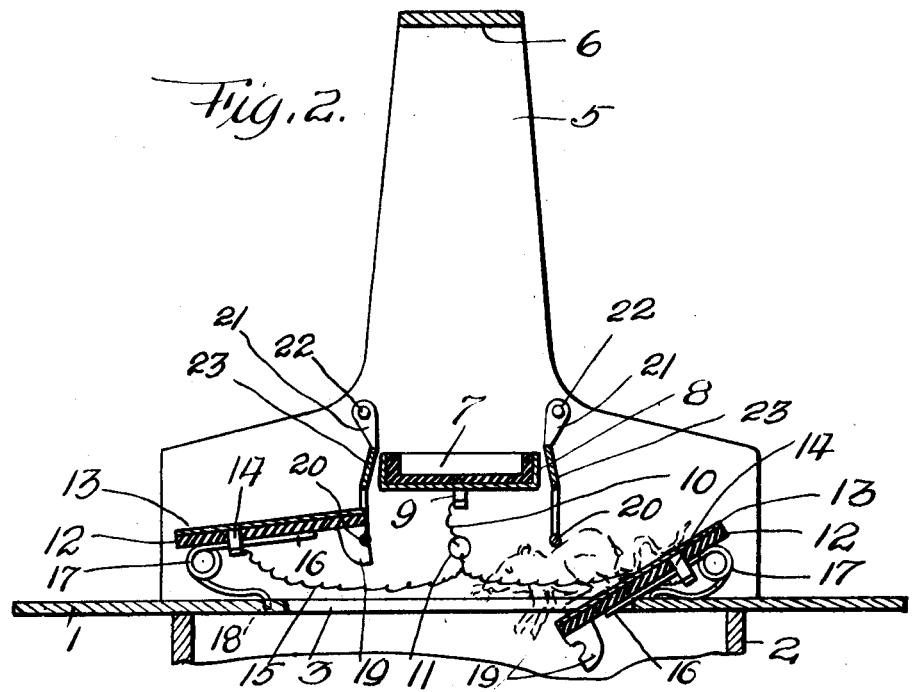
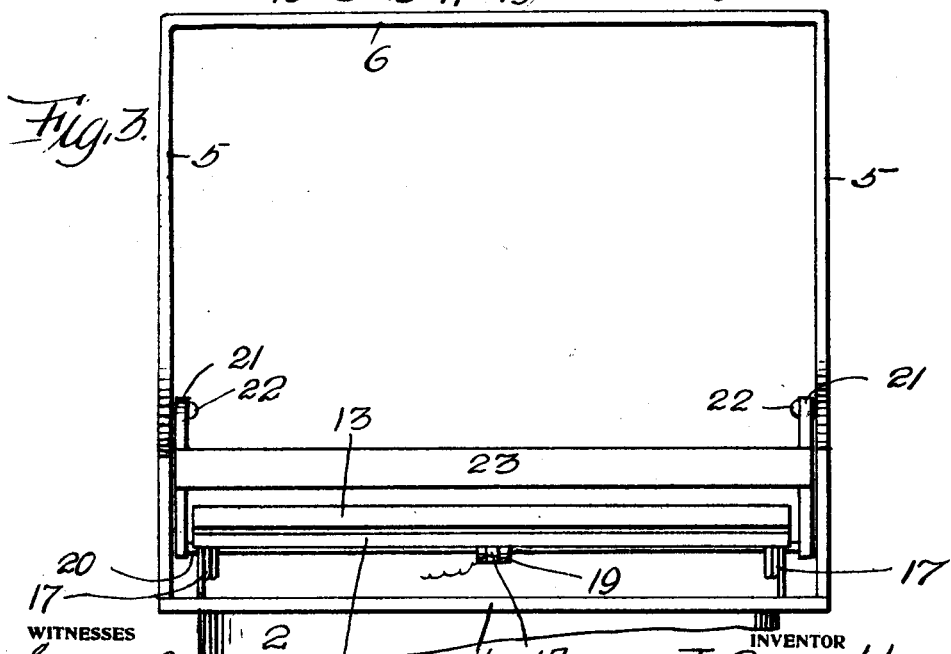
WITNESSES
Samuel Payne.
Ralph C. Evert.
INVENTOR
J. Gresko.
BY
ATTORNEYS

UNITED STATES PATENT OFFICE.

JOE GRESKO, OF BENWOOD, WEST VIRGINIA.

ELECTRIC RAT-TRAP.

1,033,579.   Specification of Letters Patent.   Patented July 23, 1912.

Application filed November 25, 1911. Serial No. 662,315.

*To all whom it may concern:*

Be it known that I, JOE GRESKO, a subject of the King of Hungary, residing at Benwood, in the county of Marshall and State of West Virginia, have invented certain new and useful Improvements in Electric Rat-Traps, of which the following is a specification, reference being had therein to the accompanying drawing.

This invention relates to electric rat traps, and the primary object of my invention is to provide a simple, durable, safe and portable trap that can be used in connection with a receptacle and a suitable source of electrical energy for electrocuting rodents and disposing of the bodies, whereby the trap can be repeatedly used.

A further object of this invention is to provide a trap embodying tiltable platforms and locking devices that are normally in an open circuit, said circuit being closed by the body of a rat.

With the above and other objects in view the invention resides in the novel construction, combination and arrangement of parts to be hereinafter specifically described and then claimed.

Reference will now be had to the drawings, wherein:—

Figure 1 is a perspective view of a portion of the trap. Fig. 2 is a longitudinal sectional view of the same, and Fig. 3 is a front elevation of the trap.

A trap in accordance with this invention comprises a base plate 1 arranged upon the upper edges of a tank or receptacle 2 adapted to contain water or a liquid disinfectant or deodorant. The base plate 1 is rectangular in plan and is provided with a central transverse opening 3. Suitably supported adjacent to the tank or receptacle 2 are gang-planks 4 that permit of a rodent easily reaching the base plate 1.

Suitably secured to the side edges of the base plate 1 are side arms 5 having the upper ends thereof connected by a transverse handle 6 by which the trap can be easily carried. Connecting the arms 5, above the opening 3, is a trough or bait holder 7 made of insulation material, as fiber and centrally of said trough there is a contact piece 8 provided with a binding post 9 to which is connected a wire 10 that extends through an opening 11 in one of the side arms 5. The wire 10 is connected to a suitable source of electrical energy, as a generator or batteries capable of producing a current of sufficient voltage to electrocute a rodent.

Arranged upon the base plate 1 adjacent to the opening 3 are tiltable platforms 12 made of insulation, as fiber and mounted upon said platforms are contact plates 13 provided with binding posts 14 extending through the platforms. Connected to the binding posts 14 are wires 15 that extend to the side arm 5 and then inwardly and through the opening 11, said wires being in an open circuit with the same source of electrical energy as the wire 10. The platforms 12, at the ends thereof, are supported by the ends 16 of coiled springs 17, said springs having the opposite ends thereof mounted in the base plate 1, as at 18. The inner edges of the platforms 12 are provided with slotted keepers 19 and these keepers are engaged by rods 20 connecting oppositely disposed latches 21, pivotally connected, as at 22 to the inner sides of the arms 5. The latches are also connected by contact bars 23 adapted to engage the contact piece 8.

A suitable bait can be placed in the trough or holder 7 and in order for a rodent to obtain the same, it is necessary that the rodent mount one of the platforms and place the fore feet against one of the contact bars 23. The bar is immediately shifted toward and into engagement with the contact piece 8, and simultaneous with this movement of the bar 23 the tiltable platform is released. Immediately upon the contact bar 23 engaging the contact piece 8 the rodent is electrocuted and the tilting platform discharges the rodent in the opening 3 and into the tank or receptacle 2. The springs supporting the tiltable platform restore said platform to its normal position, the rod 20 swinging into engagement with the keepers 19 by gravity.

The base plate 1 and the side arms 5 are preferably made of wood.

What I claim is:—

1. In an electric rat trap, the combination with a suitable source of electrical energy, and a receptacle, of a base plate mounted upon the upper edges of said receptacle and provided with a central opening, side arms carried by said base plate, an insulated trough connecting said side arms, a contact piece carried by said trough and in circuit with said source of electrical energy, tiltable spring supported insulated platforms carried by said base plate, contact plates caried by said platforms and in an open circuit with said contact piece and said source of electrical energy, keepers carried by the inner edges of said platforms, pivoted latches carried by the inner sides of said arms and engaging said keepers and adapted to be moved by a rodent's body to release said keepers, and contact bars carried by said latches and adapted to engage said contact pieces to complete an electric circuit through the rodent's body.

2. In an electric rat trap, the combination with a suitable source of electrical energy, and a receptacle, of a base plate arranged upon the upper edges of said receptacle and having a central opening, side arms carried by said base plate, an insulated trough connecting said arms above the opening of said base plate, a contact piece carried by said trough and in circuit with said source of electrical energy, coiled springs carried by said base plate, tiltable platforms of insulation supported by said springs and adapted to be tilted by the weight of a rodent's body, contact plates carried by said platforms and in circuit with said source of electrical energy, keepers carried by the inner edges of said platforms, and pivoted latches adapted to be moved by a rodent to simultaneously release said platforms and establish an electric circuit between said platforms and said contact piece through the rodent's body.

In testimony whereof I affix my signature in the presence of two witnesses.

JOE GRESKO.

Witnesses:
JOZEF ROSKOVIANSKY,
PAUL RIEDEL.